Patented Aug. 4, 1931

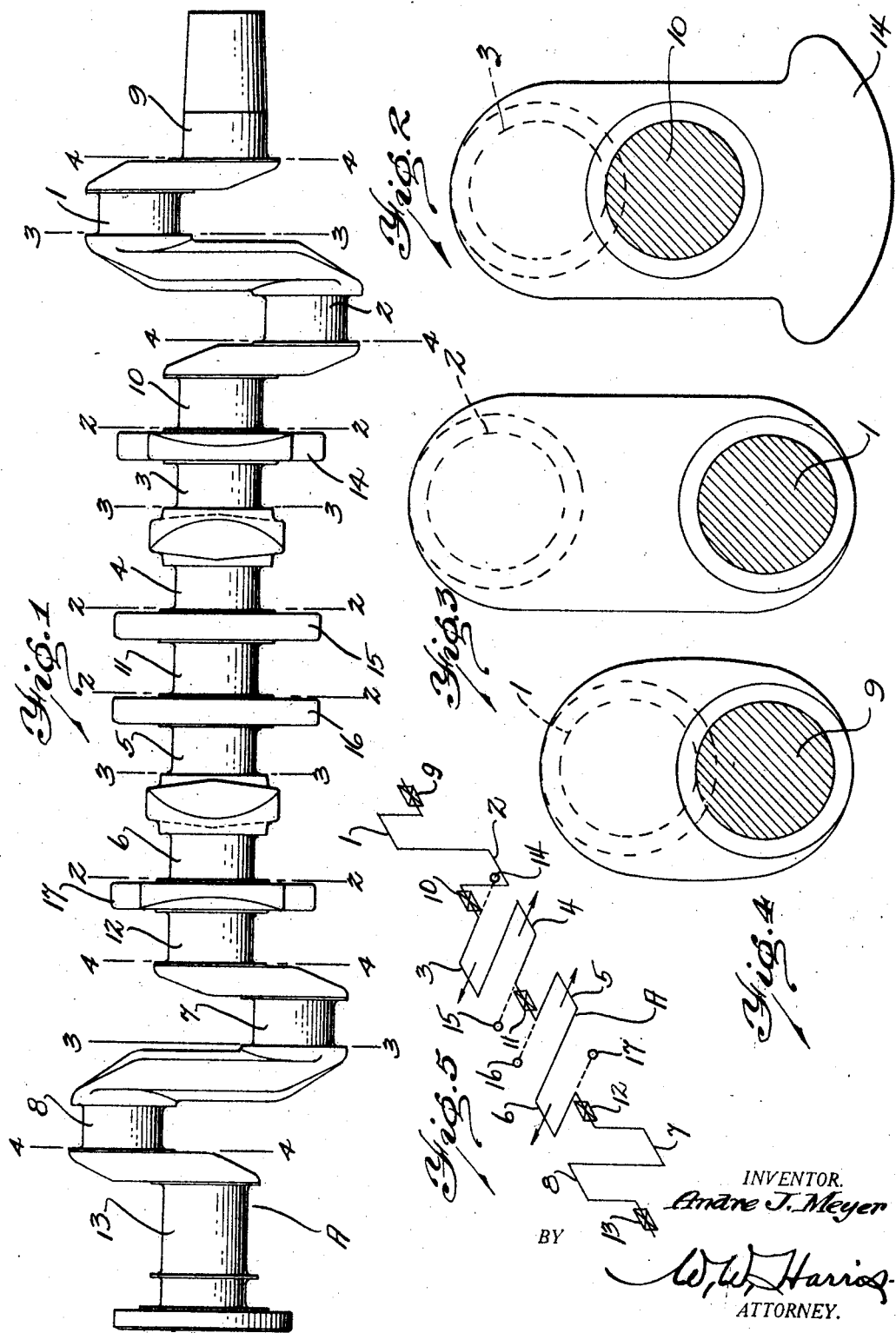

1,817,389

UNITED STATES PATENT OFFICE

ANDRE J. MEYER, OF DETROIT, MICHIGAN, ASSIGNOR TO CONTINENTAL MOTOR CORPORATION, OF DETROIT, MICHIGAN, A CORPORATION OF VIRGINIA

ENGINE CRANK SHAFT

Application filed November 14, 1927. Serial No. 232,982.

This invention relates to internal combustion engines and refers more particularly to an engine crankshaft construction.

One object of my invention resides in providing a crankshaft which has certain of its throws counterweighted and certain other throws non-counterweighted, whereby a reduction may be made in the size of the crankshaft bearings in comparison to a non-counterweighted crankshaft, the crankshaft at the same time being entirely satisfactory for present balancing requirements without requiring full counterbalancing. A further advantage in partially counterbalancing the crankshaft in accordance with my invention resides in reducing the torsional vibrations in the crankshaft.

In carrying out my invention I have illustrated an eight throw crankshaft where the center four throws lie in one plane with the end pairs of throws lying in one plane at right angles with the first plane. My invention is particularly adapted to a crankshaft having eight throws arranged generally as aforesaid although the teachings of my invention may be applied to other types of crankshafts having various arrangements, and numbers of throws and bearings as will be understood from the following illustrative description.

In the accompanying drawings,

Fig. 1 is an elevation view of the crankshaft,

Fig. 2 is a section view along the crankshaft cheeks indicated at 2—2 in Fig 1,

Fig. 3 is a section view along the crankshaft cheeks indicated at 3—3 in Fig 1,

Fig. 4 is a section view along the crankshaft cheeks indicated at 4—4 in Fig. 1, and Fig. 5 is a diagrammatic perspective view of the crankshaft.

Referring to the drawings the crankshaft A is provided with crank throws 1, 2, 3, 4, 5, 6, 7, 8, and the crankshaft main bearings 9, 10, 11, 12 and 13. The center four throws 3, 4, 5, and 6 lie in one plane and the end pairs of throws, 1, 2 and 7, 8 lie in a plane at right angles with the first plane.

In order to reduce the size of the bearings 10, 11 and 12 particularly as to their length, I have provided counterbalancing means for the crankshaft, counterweights 14, 15, 16, and 17 being formed integrally with the throws or attached thereto adjacent the throws 3, 4, 5, and 6 respectively. The end pairs of throws 1, 2 and 3, 4 are not counterbalanced.

Conditions of bearing load on the crankshaft A, for example, are worst at the center bearing 11 and by reason of the counterweighting arrangement the load on this bearing is minimized to the greatest extent. The bearing load on the intermediate bearings 10, 12 is substantially less than that on bearing 11. By reason of my counterweighting arrangement, the load on these intermediate bearings is minimized to a less extent than at the center crankshaft bearing, but the net load on the center and intermediate bearings is substantially the same. The load on the end bearings 9, 13 is not relieved by counterweighting since the end bearings may conveniently be longer than the others without adding to the overall engine length. Thus, in engines, particularly for motor vehicles, it is highly desirable to keep down the engine length, minimize torsional vibrations, and at the same time provide ample bearing area for the crankshaft loads. By my invention a compromise may be made between a completely counterbalanced chankshaft and a non-counterbalanced shaft, obtaining adequate counterbalancing, reducing torsional vibrations, minimizing the bearing dimensions and overall engine length, and simplifying and cheapening the manufacture.

In practice I find it convenient and satisfactory from a standpoint of quantity production to make the bearings 10, 11, and 12 of equal dimension, the compromise balancing obtained by the counterweights permitting this desirable condition.

What I claim as my invention is:

1. An internal combustion engine crankshaft having four center throws in one plane and end pairs of throws in a second plane at right angles with the first plane; said crankshaft having center, end, and intermediate coaxial bearing portions; said crankshaft being counterbalanced at the center bearing portion to the greatest extent, and at the intermediate bearing portions to a lesser extent.

2. An internal combustion engine crankshaft having four center throws in one plane and end pairs of throws in a second plane at right angles with the first plane; said crankshaft having center, end, and intermediate coaxial bearing portions; said crankshaft being counterbalanced at the center bearing portion to the greatest extent, and at the intermediate bearing portions to a lesser extent, and being substantially free from counterbalancing at the end bearing portions.

3. An internal combustion engine crankshaft having a plurality of throws and coaxial bearings, and counterweights carried by only a portion of the throws and being so distributed as to favor the center portion to the greatest extent and the portions intermediate the center and ends to a lesser extent.

4. An internal combustion engine crankshaft having a plurality of throws and coaxial bearings, and counterweights carried by only a portion of the throws and being so distributed as to favor the center portion to the greatest extent and the portions intermediate the center and ends to a lesser extent and the end portions to practically no extent.

5. An internal combustion engine crankshaft having four center throws in one plane and end pairs of throws in a second plane at right angles with the first plane; said crankshaft having center, end and intermediate coaxial bearing portions; said crankshaft being counterbalanced at the center bearing portion to the greatest extent, and at the intermediate bearing portions to a lesser extent, the said center and intermediate bearings having substantially equal lengths.

6. An eight throw engine crankshaft having center, end, and intermediate bearings; the first, second, seventh, and eighth throws lying in a plane at right angles with a plane containing the remaining throws; crank cheeks connecting the throws and bearings; the cheeks to either side of the center bearing having counterweighted portions; the outside cheeks of the third and sixth throws having counterweighted portions; the remaining cheeks being substantially non-counterweighted.

7. An eight throw engine crankshaft having center, end, and intermediate bearings; the first, second, seventh, and eighth throws lying in a plane at right angles with a plane containing the remaining throws; crank cheeks connecting the throws and bearings; the cheeks to either side of the center bearing have counterweighted portions; the outside cheeks of the third and sixth throws having counterweighted portions; the remaining cheeks being substantially non-counterweighted, the center and intermediate bearings being of substantially equal dimensions.

8. An internal combustion engine crankshaft having a plurality of throws and coaxial bearings, and counterweighting means distributed so as to favor the center portion of the crankshaft to the greatest extent and the intermediate portions to less extent.

9. An internal combustion engine crankshaft having a plurality of throws and coaxial bearings, and counterweighting means distributed so as to favor the center portion of the crankshaft to the greatest extent and the intermediate portions to less extent, and to still less extent the end portions.

10. A crankshaft for internal combustion engines having a plurality of throws and coaxial bearings, and counterweights associated with only a portion of said throws providing a compromise between non-counterbalancing and fully counterbalancing, said counterweights being distributed so as to favor the center portion of the crankshaft to the greatest extent.

In witness whereof, I hereunto subscribe my name this 10th day of November, A. D. 1927.

ANDRE J. MEYER.